United States Patent
Fernandes et al.

(10) Patent No.: US 10,305,217 B2
(45) Date of Patent: May 28, 2019

(54) THERMALLY-ENHANCED PLUGGABLE MODULES

(71) Applicant: Facebook, Inc., Menlo Park, CA (US)

(72) Inventors: John Edward Fernandes, Fremont, CA (US); Che Kin Leung, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/706,122

(22) Filed: Sep. 15, 2017

(65) Prior Publication Data

US 2019/0089088 A1   Mar. 21, 2019

(51) Int. Cl.
| | |
|---|---|
| *H01R 13/514* | (2006.01) |
| *G02B 6/42* | (2006.01) |
| *H01R 12/72* | (2011.01) |
| *G02B 6/38* | (2006.01) |

(52) U.S. Cl.
CPC ......... *H01R 13/514* (2013.01); *G02B 6/3867* (2013.01); *G02B 6/3893* (2013.01); *G02B 6/4292* (2013.01); *H01R 12/72* (2013.01)

(58) Field of Classification Search
None
See application file for complete search history.

(56) References Cited

U.S. PATENT DOCUMENTS

| | | | |
|---|---|---|---|
| 9,389,368 B1 * | 7/2016 | Sharf | H01R 27/00 |
| 9,620,907 B1 * | 4/2017 | Henry | H01R 13/6582 |
| 9,666,995 B1 * | 5/2017 | Phillips | H01R 13/6581 |
| 9,853,397 B1 * | 12/2017 | Bucher | H01R 13/6335 |
| 9,924,615 B2 * | 3/2018 | Bucher | H05K 7/20445 |
| 2015/0241650 A1 * | 8/2015 | Travis | G02B 6/3825 |
| | | | 385/135 |
| 2016/0211623 A1 * | 7/2016 | Sharf | H01R 13/665 |
| 2018/0049348 A1 * | 2/2018 | Bucher | H05K 7/20445 |
| 2018/0059167 A1 * | 3/2018 | Sharf | G01R 31/282 |

* cited by examiner

Primary Examiner — Sung H Pak
(74) *Attorney, Agent, or Firm* — Baker Botts L.L.P.

(57) ABSTRACT

In one embodiment, a pluggable module has fins along a length of its shell, and a planar gap on its shell in front of the fins. The fins may rise higher than an industry-standard pluggable module. The planar gap provides for a pressure drop as air reaches the fins, and thereby improves air flow. The pluggable module plugs into a port of a cage. A key pattern or rotating door on the port is configured to allow the pluggable module's fins to pass through, while also placing a height limit on non-fin regions of the shell.

19 Claims, 7 Drawing Sheets

THERMALLY-ENHANCED PLUGGABLE MODULES

TECHNICAL FIELD

This disclosure generally relates to a pluggable module and a module cage for the pluggable module.

BACKGROUND

Pluggable modules may support different types of cable links, such as fiber and copper links. Typically, a pluggable module includes a shell housing that encloses (houses) a transceiver module for a specific type of link. A cable is inserted into one end of the pluggable module to connect with the transceiver module housed within it, and an opening at an opposite end of the pluggable module exposes interface contacts of the housed transceiver module. When a pluggable module is inserted into a (module-receiving) cage, the exposed interface contacts of the housed transceiver module engage with coupling circuitry within the cage. The cage provides interface circuitry for coupling the housed transceiver module to backplane circuitry.

Pluggable modules may be used in high-speed input/output (I/O) interconnections. Different transceiver modules may also have different speed and voltage operating requirements, which place different power and heat requirements on the pluggable modules that house the transceiver modules.

SUMMARY OF PARTICULAR EMBODIMENTS

Embodiments include a pluggable module and cage suitable for both low-power and high-power applications. In particular embodiments, the pluggable module has fins along a length of at least one side of its shell (housing), and a planar gap on its shell adjacent the fins. The fins may rise higher than an industry-standard pluggable module. The planar gap provides for a pressure drop as air reaches the fins, and thereby improves air flow.

In particular embodiments, a cage for receiving a pluggable module having fins (i.e. a pluggable module in accord with the present disclosure) remains compatible with industry-standard pluggable modules having no fins. Air vents on the cage may be limited to the rear of the cage (rear half or rear third of the cage) in order to ensure that air entering the front of the cage (e.g., entering a port) flows through a majority of the length of the fins prior to exiting the rear of the cage, thereby maximizing heat transfer from the fins to the cooling air. The air vents may be constructed on any side of the cage, and each air vent may provide at least 80% open area for venting. For example, air vents may be constructed on the side and back panels on the side and back walls of the cage, respectively.

A key pattern may be constructed at a module-receiving opening of the cage where a pluggable module is inserted (e.g., a port). The key pattern may be configured to allow fins of a pluggable module to pass through the module-receiving opening into the interior of the cage, while also placing a shell-height limit on the shell of the pluggable module, excluding the fins. This shell-height limit may be selected to be compatible with the shell-height of an industry-standard pluggable module. For example, the fins may be located within a predefined (e.g. central) fin region of the shell's top surface, i.e. the shell's top service may have a non-fin region at one or both sides of the fin region. The key pattern at the module-receiving opening of the cage may define a separation gap aligned with the fin region and sufficient to permit entrance of the fins into the module-receiving opening, while also placing an upper height limit (shell-height limit) on the non-fin region of the pluggable module. This upper height limit may be chosen to be compatible with an industry-standard pluggable module.

Optionally, a rotating door (e.g., a spring-loaded door) may be positioned at the module-receiving opening of the cage, so that as a pluggable module with fins is inserted, the fins push back the rotating door permitting access to the interior of the cage, but if a standard pluggable module with no fins is inserted, the rotating door remains closed.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

A pluggable module for use with optical (e.g., fiber) and electrical/electronic (e.g., copper) transceivers may be modular. That is, a shell (i.e. housing) may enclose (house) a transceiver for a specific type of link (e.g., fiber or copper), and an appropriate type of wire, or cable, may be inserted into a back-end part of the pluggable module to construct a wire/cable-to-module link. By replacing the housed transceiver and wire, a pluggable module shell may be used with different types of links. It is to be understood that higher frequency and voltage applications may have higher power requirements, and may be characterized by higher heat generation.

A pluggable module may plug into a port of a (module) cage, which may take different port configurations. For example, a cage may have a single module-receiving opening (port), in which case it may termed a 1×1 cage. Alternatively, a cage may consist of a row of N module-receiving openings (i.e. up to N pluggable modules may be plugged in a row into the cage), in which case the cage may be termed a 1×N cage. If a cage has M rows of module-receiving openings (ports), and N module-receiving openings (ports) in each row, then cage may be termed an M×N cage. For example, a 2×1 cage would be 2 ports high and 1 port wide, and a 2×N cage would be 2 ports high and N ports wide. Typically, a cage includes coupling circuitry corresponding to each port, and positioned within its interior to engage with (electrically couple to) a pluggable module's housed transceiver when the pluggable module is fully plugged into a module-receiving opening of the cage. In this manner, the cage may serve as an interface between a pluggable module and backplane circuitry. For example, the backplane circuitry may be attached to a rack, on which a cage may be mounted. That is, the cage may be coupled to a printed circuit board (PCB) that is on the rack or attaches to the rack. Any suitable coupling technology, such as thru-hole, press fit, or surface-mount technology (SMT), may be used to couple (i.e. mount) the cage to the PCB in the construction of a PCB assembly.

In particular embodiments, a pluggable module to be used in the construction of a transceiver, such as an optical transceiver, and a cage for receiving the transceiver may be made compatible with suitable industry-standard form factors. For example, a transceiver may be a small form-factor pluggable (SFP) transceiver, which is a hot-pluggable transceiver that may be used for both telecommunication and data communications applications, or an enhanced small form-factor pluggable (SFP+) transceiver, which is an enhanced version of the SFP that supports data rates up to 16 Gbit/s. Alternatively, a transceiver may be a quad small form-factor pluggable (QSFP) transceiver (and its variants, e.g., QSFP+, QSFP14, and QSFP28), which generally interfaces networking hardware (such as servers and switches) to a fiber optic cable or to an active/passive copper connection. Another form factor example is a compact small form-factor pluggable (CSFP), which is a version of SFP with similar mechanical form factor, but allowing for two independent bidirectional channels per port, which may increase port density and decrease fiber usage per port.

In particular embodiments, a pluggable module may be suitable for both low-power transceivers, for example, 3.5 watts-per-channel such as the QSFP28, or higher-power transceivers, for example, 7 to 12 (or more) watts-per-channel. Generally, as higher power requirements are adopted, changes to industry-standard formats for a pluggable module or cage may be needed to handle (e.g., dissipate) higher heat generation. In particular embodiments, the present pluggable module remains suitable for low-power applications and for high-power applications of 20 watts, or more, per channel. Also in particular embodiments, a cage is provided that supports the pluggable module of the present embodiments while remaining compatible with existing industry standard pluggable module form factors, such as those described above.

In particular embodiments, the shell of a pluggable module may have multiple sides, and (cooling) fins may be positioned along a length of at least one side of the shell, extending from the front of the shell (where it plugs into a cage) toward the back of the shell. The fins provide the pluggable module with improved heat dissipation, which may help offset (reduce) increased heat that may result from higher power applications. The fins are attached to the shell (i.e., to the pluggable module), and may be, for example, stacked fins, plate fins, or extrusion fins. In particular embodiments, the fins are attached to a top-side of the shell and extend higher than the height of an industry-standard pluggable module. The extra height of the fins provides for increased fin-surface area, and may thereby further improve heat dissipation. A non-fin gap, which may be substantially planar, is defined on the same side as the fins and positioned on a region of the shell immediately before (adjacent) an area where fins are positioned such that the non-fin gap extends out of a cage port when the pluggable module is fully plugged into a cage. The non-fin gap provides for a pressure drop as air enters the cage port and reaches the fins, and thereby improves air flow, thereby improving heat transfer from the fins to the cooling air. The present pluggable module may thereby achieve higher power dissipation at lower temperatures and reduce air flow rate requirements, which also reduce fan power requirements.

In particular embodiments, a pluggable module may have a back-end portion where a wire or cable, (e.g. optical fiber wire/cable) is inserted, and a shell extending from the back-end portion to a front-end portion, where one or more contacts (such as contacts of a transceiver module housed within the pluggable module) may be exposed, or accessed. The exposed contacts may be arranged into one or more rows of contacts, such as in a manner similar to QSFP28 transceivers, which have one row of contacts, or QSFP-DD transceivers, which have two rows of contacts. That is, the shell may house a printed circuit board assembly (PCBA) for different arbitrary circuitry, such as circuitry for receiving and transmitting optical/electrical signals (e.g., a transceiver module). The PCBA may further provide the exposed contacts, which may communicate (mate) with coupling circuitry within a cage.

The back-end portion may be joined to the shell, and both the back-end portion and the shell may each have a box-like (cuboid) shape. In particular embodiments, however, the back-end portion may be taller than the shell. Additionally, a non-fin gap adjacent to the fins may be approximately 5 mm long, form a substantially planar surface, and extend from a junction of the back-end portion and the shell to the fins on the shell. The fins may be an integral part of the shell, and may be drawn out from the shell or attached to the shell. In particular embodiments, when fully inserted into a cage, the cage opening where the module is inserted (i.e., module-receiving opening or port) may be positioned within this non-fin gap. The pluggable module may have multiple fins on one or more surfaces/sides of the shell. Fins on the shell may extend outward (e.g. higher, lower, laterally) more than the back-end portion. For example, fins on a top surface of the shell may extend higher than the height of the back-end portion. In particular embodiments, the fins may extend more than 25% (for example, from one-third to one-half) higher than the height of the back-end portion.

In particular embodiments, a (module) cage compatible with the present pluggable module is provided. In particular embodiments, the cage may have a width and depth similar to an industry-standard QSFP cage (for example, 18.35 mm by 72.4 mm for an industry-standard 1×1 QSFP cage), but may be taller than the industry-standard QSFP cage (e.g., 8.5 mm for an industry-standard 1×1 QSFP cage compared to (e.g., 8.5 mm+5.72 mm fin-height) 14.22 mm for a cage compatible with the present pluggable module). The increased height may accommodate taller fins on the pluggable module, if needed. That is, at least one port dimension (e.g., height) of a cage compatible with the present pluggable module may be increased by an amount substantially similar to the height of the pluggable module's fins, as compared to the port of a corresponding type of industry-standard cage that accommodates a pluggable module without fins. Air vents on the cage may be limited to the rear of the cage (rear half or rear third of the cage) in order to ensure that air entering the front (e.g., the module-receiving opening) of the cage flows through (all or a majority of the length of) the fins prior to exiting the cage. For example, the vents may be positioned to ensure that they do not cover more than a third (or quarter) of the length of the fins. The air vents may be constructed on side, back, top or bottom panels on the cage, and may optionally extend outward from an exterior surface of the cage (e.g., extend outward from an exterior side wall, back wall, ceiling or floor of the cage) for improved airflow. Each air vent may provide a significant area for venting (e.g., at least 80% open area for venting).

Optionally, a key pattern may be constructed at module-receiving openings (e.g., ports) of the cage, where the key pattern is configured to allow fins of the present pluggable module to pass uninhibited into the interior of the cage, while also placing a dimensional limit on non-fin regions of the shell (e.g., on parts of the shell not having fins). The key pattern may help the present cage maintain backwards compatibility with pluggable modules that do not have fins, such as industry-standard QSFP (and similar) modules. For example, the height limit placed by the present key pattern on the on non-fin regions of the present shell may be selected to be substantially similar to the shell height (e.g., 8.5 mm) of an industry-standard QSFP module. That is, the fins may be located within a fin-region (e.g., a central area or an off-center area of the shell's top surface) adjacent to a non-fin region, and the key pattern at the module-receiving opening of the cage may define a barrier aligned with the non-fin region and define an opening aligned with the fin-region to permit entrance of the fins into the interior of the cage.

Optionally, at least one rotating door (e.g. a spring-loaded door) may be positioned at module-receiving openings of the cage, so that as a pluggable module with fins is inserted into the cage, the fins push back the rotating door(s) permitting access to the interior of the cage. The fins may maintain the door rotated while the pluggable module is inserted. However, if a pluggable module without fins (e.g., an industry-standard QSFP pluggable module) is inserted into the present cage, the rotating door remains closed and places non-fin dimensional limits (e.g., industry-standard dimensional limits) on the pluggable module so that the present cage behaves in a manner similar to a typical cage (e.g., an industry-standard QSFP cage) designed to accommodate pluggable modules not having fins.

In particular embodiments, a cage may incorporate the key pattern, the rotating door, or both. For example, if a pluggable module has fins on two sides of its shell (e.g. fins the shell's top-side and fins on a side-wall of the shell), the cage may provide a key pattern to permit unobstructed entrance to the fins on the top-side, and provide a rotating door to permit access to the fins on the side-wall. Alternatively, the cage may provide a top key pattern and a side key pattern, where the top key pattern permits entry to the fins on the top-side of the shell and the side key pattern permits entry to the fins on the side-wall of the shell. Further alternatively, the cage may provide a top rotating door and side rotating door, where the top rotating door permits access to the fins on the top-side of the shell and the side rotating door permits access to the fins on the side-wall of the shell.

It is to be understood that some or all of the cage examples in the present embodiments may be configured with any suitable configuration of module-receiving openings. That is, a cage in accord with the present disclosure may have any suitable cage port configuration, such as 1×1, 1×N, M×N, etc.

Figure 1:
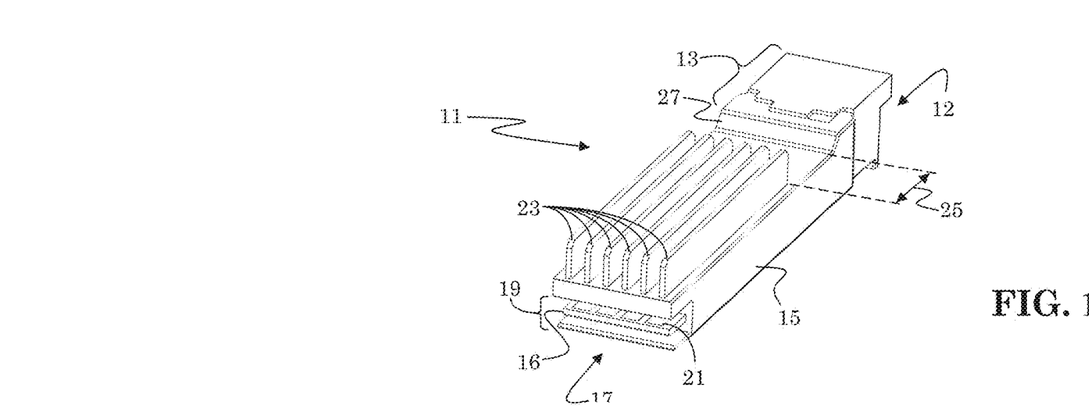
FIG. 1 provides a perspective view of a pluggable module with fins.
Figures 2A, 2B, 2C:
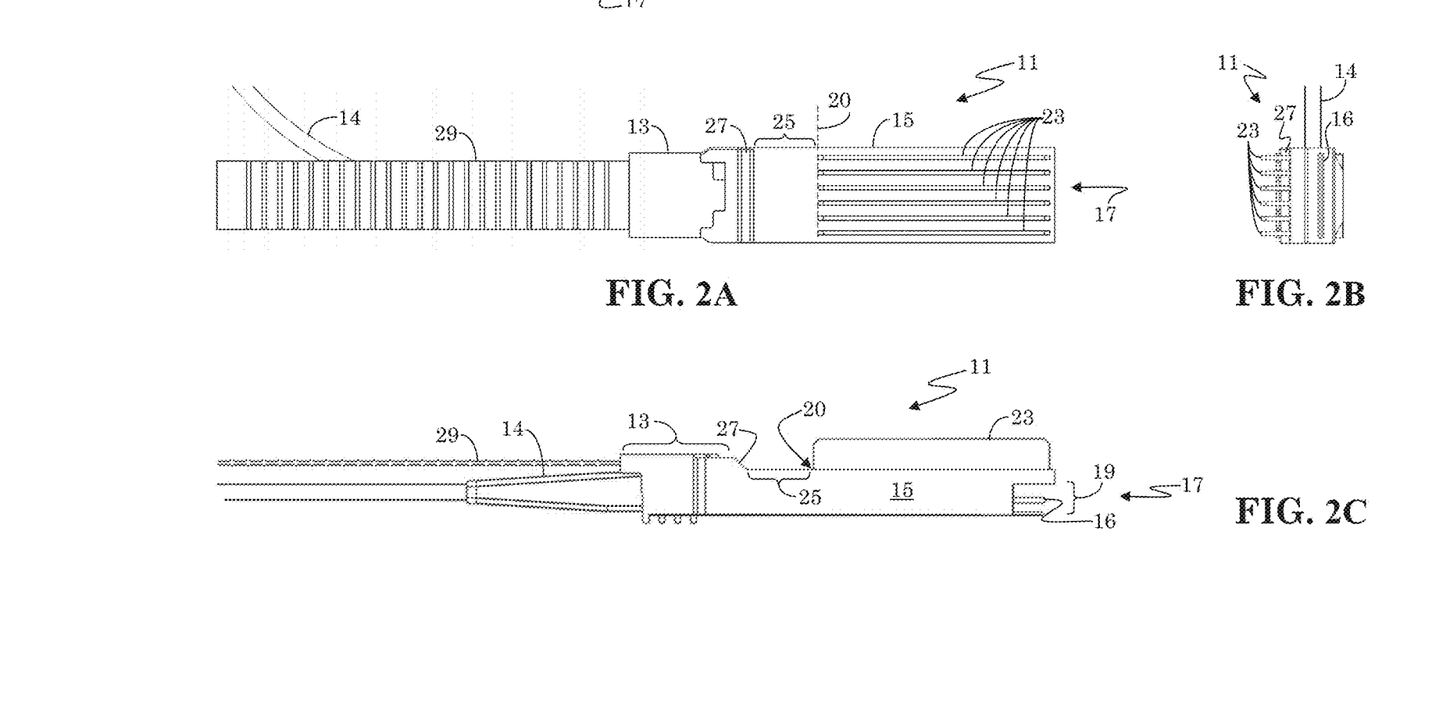
FIGS. 2A, 2B, and 2C provide top, front, and side plan views, respectively, of the pluggable module of FIG. 1.

FIG. 1 provides a perspective view of a pluggable module 11 with fins. FIGS. 2A, 2B, and 2C provide top, front, and side plan views, respectively, of the pluggable module 11 of FIG. 1. With reference to FIGS. 1, 2A, 2B, and 2C, a pluggable module may include a back-end portion 13 having a cable-receiving opening 12 into which a wire/cable 14 may be inserted. The pluggable module further has a shell 15 extending from the back-end portion 13 to a front-end portion 17 of the pluggable module 11. The shell 15 may have a generally rectangular box (e.g., cuboid) shape. A printed circuit board assembly (PCBA) 16 with circuitry for receiving and transmitting signals (e.g., a transceiver module) may be housed within the shell 15. As shown, the front-end portion 17 has a contact-exposing opening 19, where one or more contacts 21, such as on the PCBA 16, may be accessed. In particular embodiments, multiple contacts 21 may be arranged into one or more rows on one or more PCBAs.

In the present embodiment, multiple fins 23 may be constructed on at least on surface (e.g., side) of the shell 15. For example, the shell may have six plate fins, each being 5.72 mm tall, 44.54 mm long, and 0.8 mm thick, and the fins may be arranged to have a fin pitch (e.g., separation from one fin-center to an adjacent fin-center) of 2.91 mm. The fins 23 may extend along the length of the shell 15 from a start position 20 toward the front-end portion 17. A non-fin gap 25 may be defined on the shell 15 between the back-end portion 13 and the fins 23. The non-fin gap 25 may be a substantially planar surface on the shell 15. Non-fin gap 25 may be, for example, 5 mm long.

A front wall 27, which may be vertical or slanted, may extend from a front edge of a top surface of the back-end portion 13 to a back edge of a top surface of the shell 15. In the present embodiment, the non-fin gap 25 extends from the base of front wall 27 (i.e., the back edge of the top surface of the shell 15) to the start position 20 of at least one of the fins 23.

As shown in FIG. 2C, in particular embodiments, the fins 23 on the top surface of the shell 15 may optionally extend higher than the top-most surface of the back-end portion 13. For example, the fins 23 may extend from one-quarter to one-half (or more) higher than the height of the top-most surface of back-end portion 13. A larger surface area provided by taller fins increases a heat dissipating capability of pluggable module 11, but may make the pluggable module 11 incompatible with an industry-standard QSFP cage. Compatibility with an industry-standard QSFP cage may be maintained by lowering the height of the fins 23, if desired.

The pluggable module 11 may be part of a transceiver assembly. That is, a transceiver module may be part of PCBA 16. Typically, the wire/cable 14, which may be fiber optic or copper, is inserted into the cable-receiving opening 12 of back-end portion. A pull-tab 29 may be attached to the pluggable module 11 to facility removal of the pluggable module 11 from a cage to which it may be plugged. When pluggable module 11 is plugged into a cage, contacts 21 on PCBA 16 may engage with coupling circuitry within the cage for access by back-plane circuitry. The present pluggable module 11 may be used in construction of various types of small form-factor transceivers, such as an SFP+, QSFP, CSFP, or SFSW.

Figure 3A:
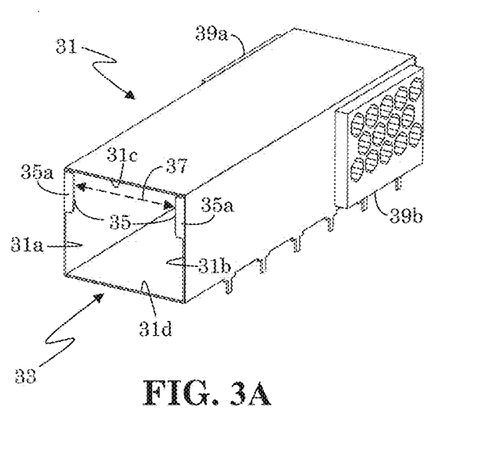
FIG. 3A is a perspective view of a (module) cage suitable for receiving a pluggable module with fins, such as the pluggable module illustrated in FIGS. 1, 2A, 2B, and 2C.
Figure 3B:
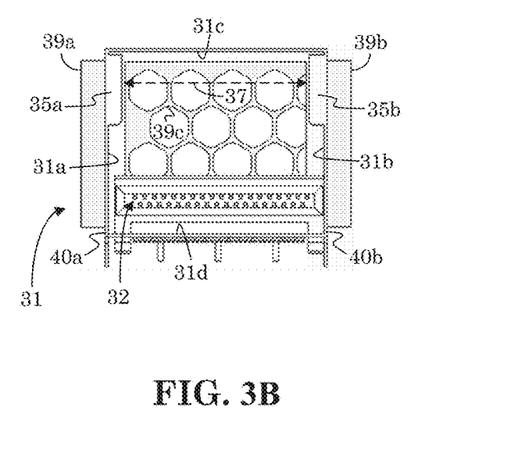
FIG. 3B is front plan view of the module cage of FIG. 3A.

FIG. 3A is a perspective view of a (module) cage 31 suitable for receiving a pluggable module having fins, such as the pluggable module 11 illustrated in FIGS. 1, 2A, 2B, and 2C. FIG. 3B is front plan view of the cage 31 of FIG. 3A. With reference to FIGS. 3A and 3B, cage 31 has a module-receiving opening (e.g., port) 33 at a front end that provides entry into a module-receiving cavity within the cage 31. A pluggable module would plug into module-receiving opening 33, and as is explained above, a PCBA housed within the pluggable module may engage with coupling circuitry 32 within the module-receiving cavity of the cage 31 so as to couple contacts on the PCBA with additional (e.g., backplane) circuitry accessible via the cage 31. In the present example, module receiving opening 33 has a generally rectangular shape, and thus has two pairs of opposing walls, including opposing sidewalls 31a/31b and opposing ceiling 31c and floor 31d. Optionally, a key pattern 35 may be constructed at module-receiving opening 33. In the present example, the key pattern 35 includes a first key-pattern portion 35a and second key-pattern portion 35b, which may be configured to create a separation gap, or opening gap, 37 aligned with fin positions on a pluggable module and sized to permit entrance of fins into the module-receiving opening 33 as the pluggable module is plugged into the cage 31.

Figure 4:
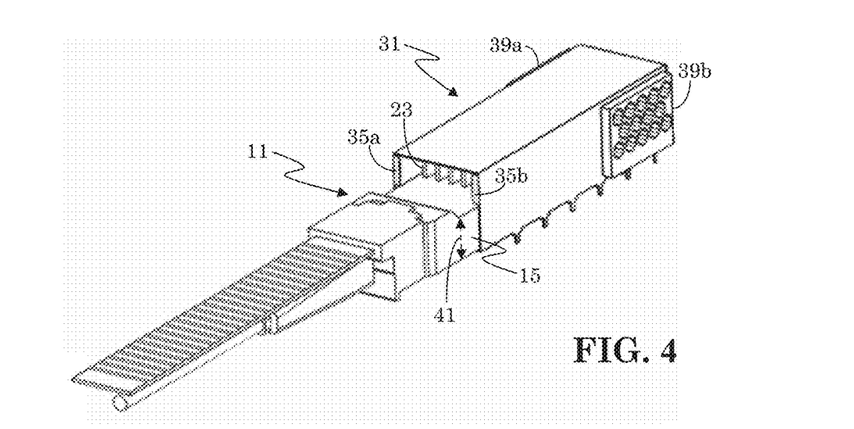
FIG. 4 illustrates a pluggable module with fins plugged into the (module) cage of FIGS. 3A and 3B.

For example, FIG. 4 illustrates a pluggable module with fins plugged into the (module) cage 31 of FIGS. 3A and 3B. In the present example, fins 23 are located within a central area on the top surface of the shell 15. In the present example, key-pattern portions 35a and 35b are on opposing sidewalls 31a and 31b (see FIGS. 3A and 3B), respectively, of the module-receiving opening 33. Key-pattern portions 35a and 35b extend toward each other, and maintain separation gap 37 sufficient for permitting entrance of the fins 23 into the module-receiving opening 33. Additionally in the present example, the height 41 of shell 15 is assumed to be substantially similar to a shell height of an industry-standard QSFP pluggable module, such as 8.5 mm for a QSFP28 pluggable module. To maintain compatibility of the present cage 31 with the industry standard QSFP module, the first and second key portions 35a and 35b are positioned and sized to create an opening (below them) suitable for height 41 (e.g., of 8.5 mm) in areas of the shell 15 not having any fins, as shown.

It is to be understood that if the position of fins 23 were changed, then the key pattern 35 would be changed to accommodate the change in fin position. For example, if fins 23 were positioned off-center, such as starting at one side-edge of the top surface of shell 15 and distributed partway across the top surface of the shell 15 to an opposite side-edge of the shell 15, then the key-pattern portion (35a or 35b) corresponding to the one side-edge of shell 15 where the fins start may be removed in order to permit the fins access into the cage 31. Similarly, if instead of being positioned on the top surface of the shell 15, the fins 23 were positioned on a sidewall of the shell 15, then a differently shaped module-receiving opening 33 or key pattern 35 may be needed to permit the fins 23 entrance through module-receiving opening 33 into the interior of cage 31.

Figure 5:
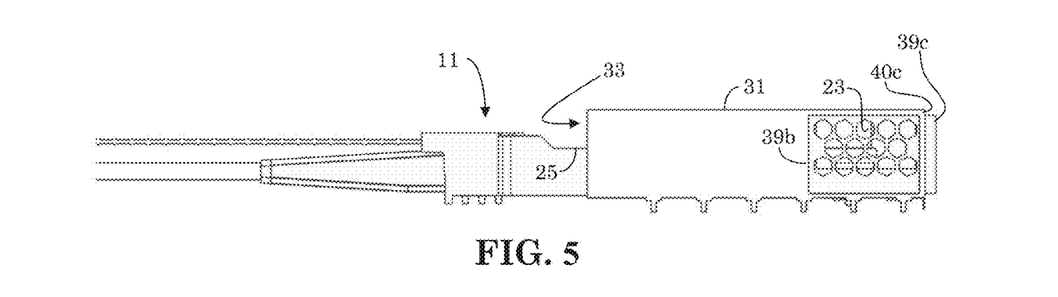
FIG. 5 illustrates a side plan view of a pluggable module with fins plugged into the (module) cage of FIGS. 3A and 3B.

FIG. 5 illustrates a side plan view of a pluggable module 11 with fins plugged into the (module) cage 31 of FIGS. 3A and 3B. As illustrated, the cage 31 may be sized such that when pluggable module 11 is fully inserted (plugged) into the cage 31, the module-receiving opening 33 is positioned within (e.g., mid-way or at the beginning of) the non-fin gap 25 of the pluggable module 11. This provides for improved air flow into cage 31 through the module-receiving opening 33. Optionally, the non-fin gap 25 may be 5 mm long. Further Optionally, the length of pluggable module 11 may be made 5 mm longer than the length (e.g., 72.4 mm) of an industry-standard QSFP28 pluggable module. This increased length may correspond to the length of the non-fin gap 25. In this way, the non-fin gap 25 may extend to the exterior of the cage 31 and promote air-flow into the cage 31 and through the fins 23 within the cage 31.

As shown in FIGS. 3A, 3B, 4 and 5, the cage 31 may have air vents 39a, 39b, and 39c positioned within an area of the cage 31 extending from the rear end of the cage 31 to not more than one-half (or one third) of the length of the module-receiving cavity. That is, air vents 39a, 39b, and 39c may be limited to the rear half or third of the cage 31. In the present example, air vents 39a and 39b are positioned on outer sidewalls 40a and 40b, respectively, of cage 31, and air vent 39c is positioned on an outer back wall 40c of cage 31. As is evident from FIG. 5, by limiting the position of the vents 39a, 39b, and 39c to the rear of the cage 31, air entering module-receiving opening 33 is made to go through a majority of the length of fins 23 before exiting the rear of cage 31. To aid air flow, air vents 39a, 39b, and 39c may be made to provide 82% (or at least 80%) open area for venting. It has been found that this amount of open area for venting is sufficient to contain 50 GHz signals on a PCBA of a pluggable module. To further aid air flow, air vents 39a, 39b, and 39c may extend outward from exterior surfaces of the cage 31. For example, air vent 39a extends outward from outer sidewall 40a of cage 31 (see FIG. 3B), air vent 39b extends outward from outer sidewall 40b of cage 31, and air vent 39c extends outward from back wall 40c of cage 31 (see FIG. 5). It is noted that there is no integrated heat sink within the present cage 31.

Figure 6:
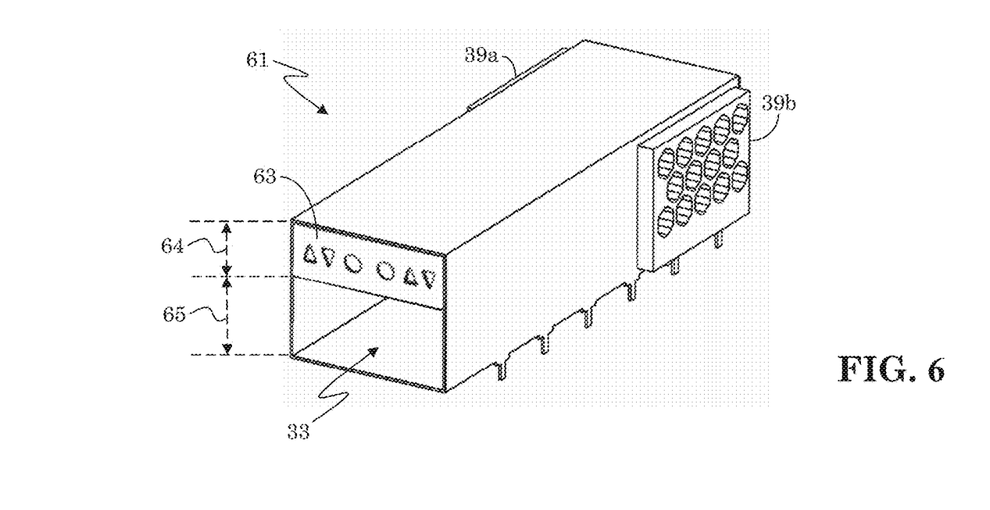
FIG. 6 is a perspective view of another (module) cage suitable for receiving a pluggable module with fins, such as the pluggable module illustrated in FIGS. 1, 2A, 2B, and 2C.
Figure 7:
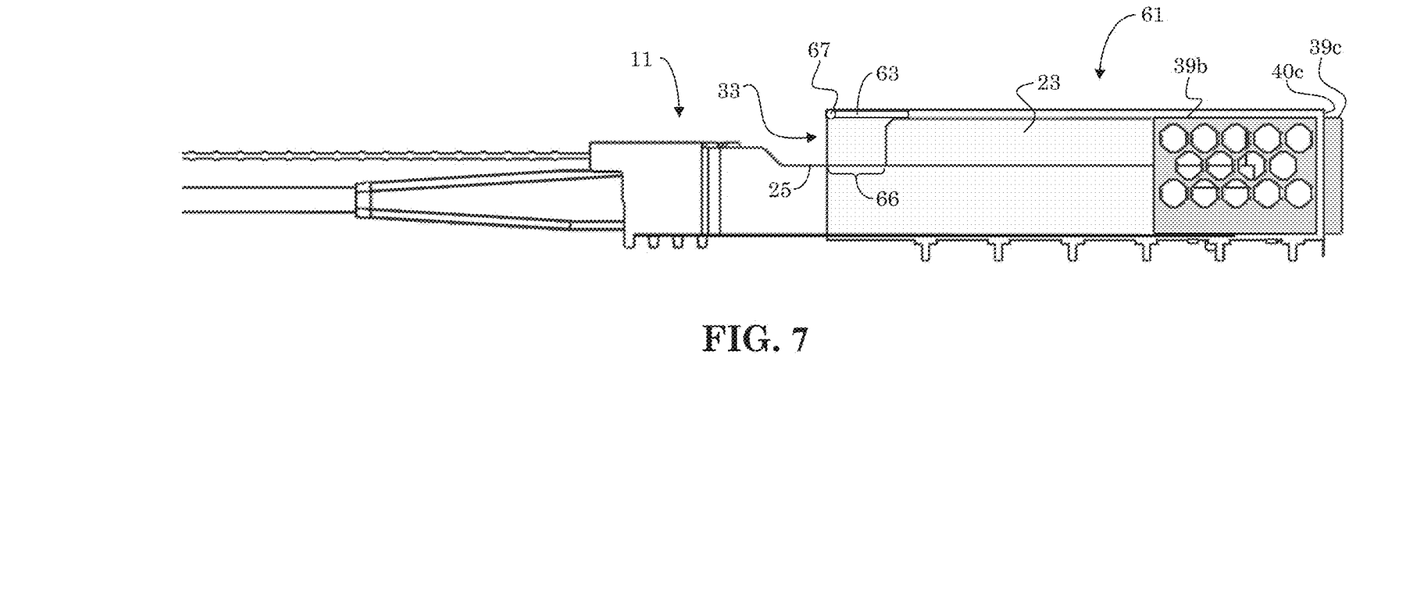
FIG. 7 is cut-way, side plan view of the cage of FIG. 6 with a pluggable module with fins plugged in, and providing a partial interior view of cage.

FIG. 6 is a perspective view of another (module) cage 61 suitable for receiving a pluggable module 11 with fins, such as the pluggable module 11 illustrated in FIGS. 1, 2A, 2B, and 2C. FIG. 7 is cut-way, side plan view of the cage 61 of FIG. 6 with a pluggable module 11 with fins plugged in, and providing a partial interior view of cage 61. Cage 61 is substantially similar to cage 31 with the exception of adding a rotating door 63 and, in the present example, optionally omitting key pattern 35. All elements similar to those of FIGS. 3A and 3B have similar reference characters and are described above. A height 65 of an open area below rotating door 63 may be made to substantially match the height of the shell of an industry-standard pluggable module, such as a QSFP28. In this manner, an industry-standard pluggable module may be plugged into module-receiving opening (port) 33 with rotating door 63 remaining closed and providing the expected height clearance. Additionally, the height 64 of rotating door 63 may be made taller (e.g., >5.72 mm) than the fins on the pluggable module 11 to assure enough clearance for the fins to enter the interior of the cage 61 when the pluggable module 11 is plugged into module-receiving opening 33.

However, when a pluggable module having fins is plugged into cage 61, as shown in FIG. 7, the fins 23 push against rotating door 63 causing it rotate toward the interior of cage 61. In the present example, rotating door 63 rotates about a pivot point (or rod) 67. Optionally, the height 64 of rotating door 63 may be selected so that rotating door 63 remains rotated (i.e. held in a rotated position by fins 23) while the pluggable module 11 remains inserted (fully plugged) in cage 61. In other words, the height 64 of rotating door 63 may be selected to not only be taller than the fins 23, but to also be longer than the portion 66 of non-fin gap 25 that is within the interior of cage 63 when pluggable module 11 is fully plugged into cage 63. In this manner, the module-receiving opening 33 is made larger by the act of plugging in a pluggable module with fins (e.g., pluggable module 11) than when a pluggable module without fins (e.g. an industry standard pluggable module) is plugged in. The larger module-receiving opening 33 provides for improved air flow into the interior of cage 61. Optionally, rotating door 63 may be a spring loaded door, such as by pivot point 67 being part of a spring hinge or by addition of a spring attached to rotating door 63.

Figure 8:
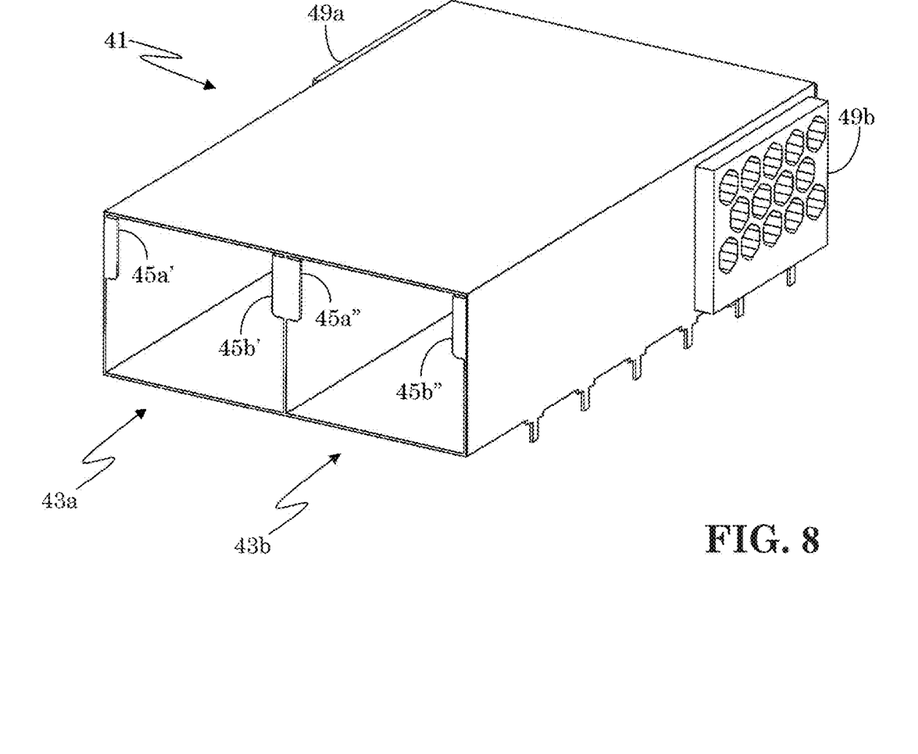
FIG. 8 illustrates an example of a (module) cage having a 1×2 port configuration.
Figure 9A:
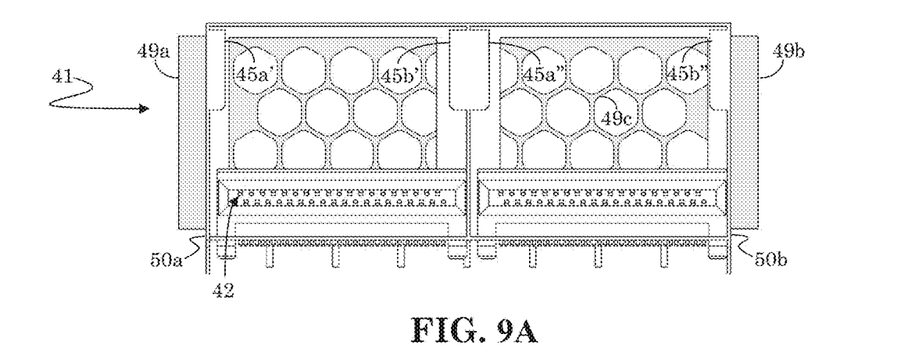
FIGS. 9A, 9B, and 9C respectively provide a front, back, and side plan view of the (module) cage of FIG. 8.
Figure 9B:
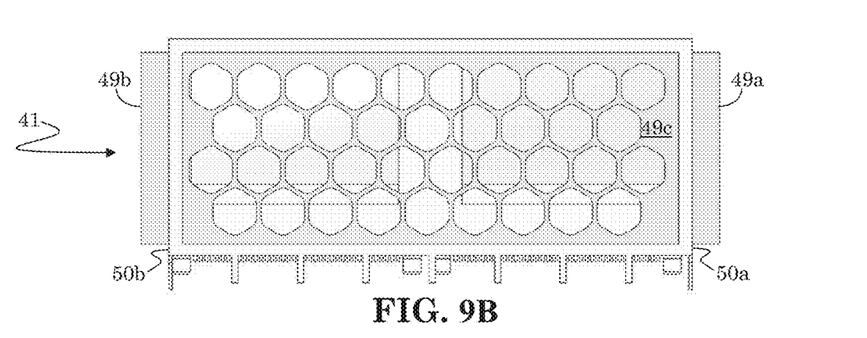
Figure 9C:
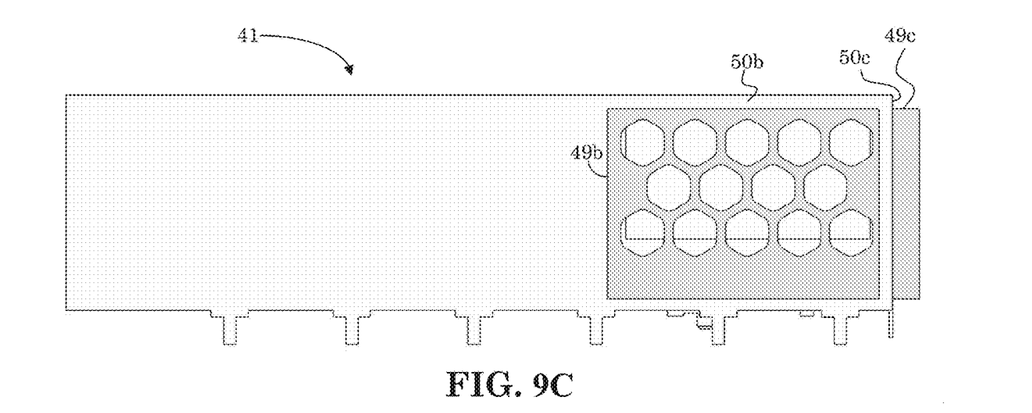

As is explained above, in particular embodiments, the cage 31 or 61 may be configured to have multiple module-receiving openings 33 in any of multiple known port configurations, such as 1×1, 1×N, M×N, etc. For instance, FIG. 8 illustrates an example of a (module) cage 41 having a 1×2 port configuration. FIGS. 9A, 9B, and 9C respectively provide a front, back, and side plan view of the (module) cage 41 of FIG. 8. In the present example, cage 41 has a configuration similar to that of cage 31 FIGS. 3A and 3B, but it is to be understood that the present discussion is equally applicable to cage 61 of FIG. 6. It is further to be understood that although FIGS. 8 and 9A-9C illustrate a 1×2 port configuration, the general elements of the 1×2 cage 41 are similar to those of the 1×1 cage 31 of FIGS. 3A and 3B. Cage 41 has two module-receiving openings (ports) 43a and 43b, each with its respective key-pattern portions 45a'/45b' and 45a"/45b", to accommodate two pluggable modules. Cage 41 has side air vents 49a/49b on respective outer sidewalls 50a/50b and a back air vent 49c on an outer back wall 50c. Like in the case of cage 31, the air vents 49a, 49b, and 49c are limited to the rear half or third of the length of the cage 41 and may provide at least 80% open area for venting. Cage 41 may also have coupling circuitry 42 (respective for each port) within its module-receiving cavity to engaged with a PCBA housed within a pluggable module, and thereby couple contacts on the housed PCBA with additional circuitry.

Figure 10:
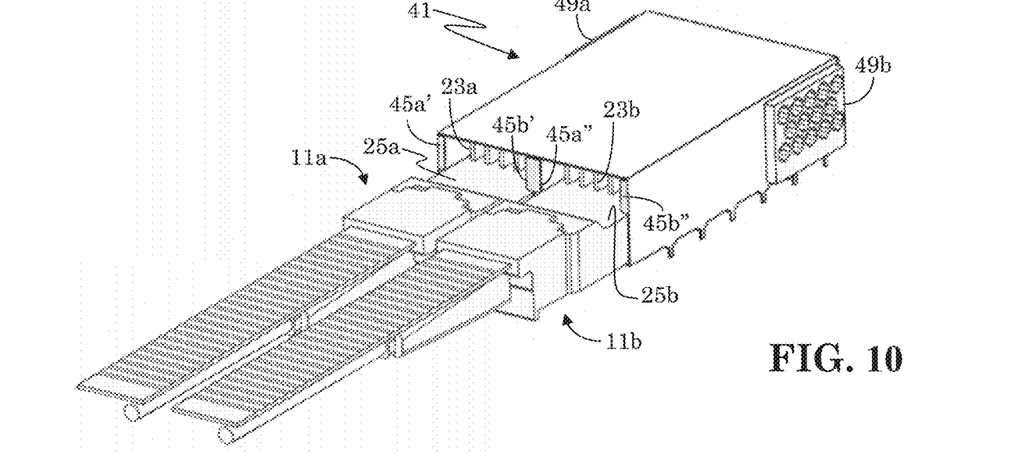
FIG. 10 illustrates two pluggable modules with fins plugged into the cage of FIG. 8.
Figure 11A:
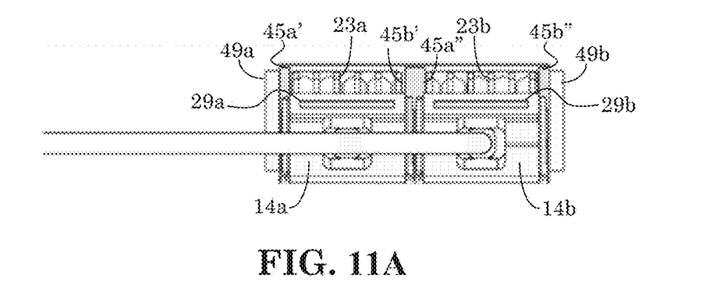
FIGS. 11A, 11B, and 11C respectfully illustrate front, top, and side plan views of the pluggable module and cage of FIG. 10.
Figure 11B:
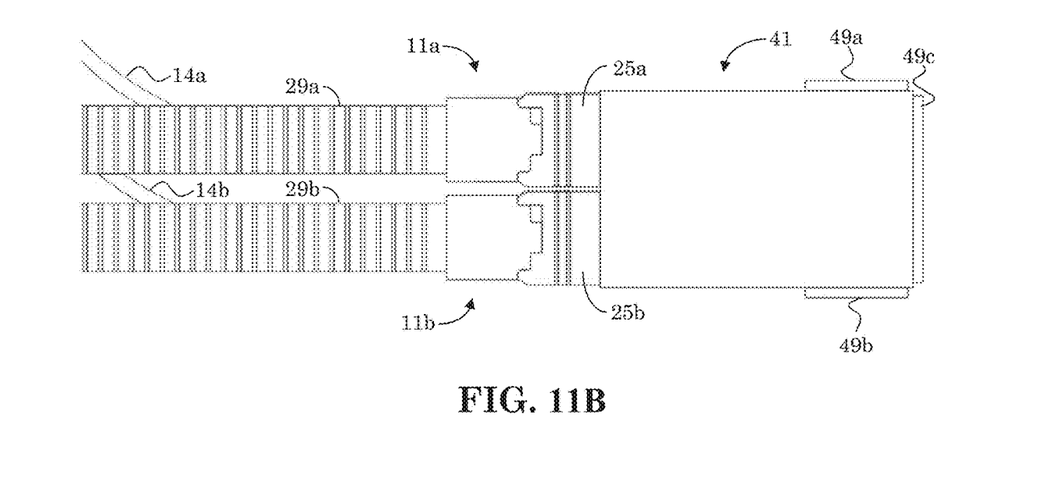
Figure 11C:
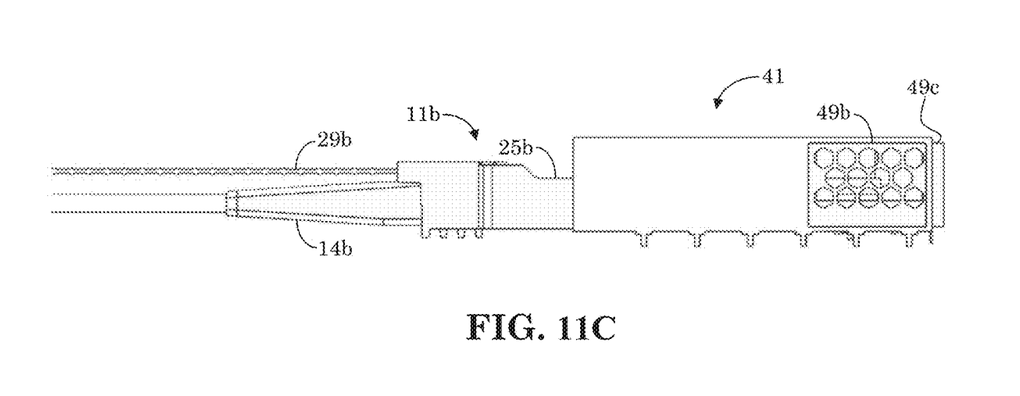

FIG. 10 illustrates two pluggable modules, 11a and 11b, with fins plugged into the cage 41 of FIG. 8. FIGS. 11A, 11B, and 11C respectfully illustrate front, top, and side plan views of the pluggable modules (11a and 11b) and cage 41 of FIG. 10. In the present example, pluggable modules 11a and 11b are each examples of pluggable module 11 of FIGS. 3A, 3B, 4, and 5. All elements similar to those of FIGS. 3A, 3B, 4 and 5 have similar reference characters, and are described above, with the addition of an appended distinguishing character "a" or "b" for respective pluggable modules 11a or 11b. Like before, key-pattern portions 45a'/45b' provide a separation gap sufficient for fins 23a of pluggable module 11a to enter the module-receiving cavity (interior cavity) of cage 41. As shown, when pluggable module 11a is fully plugged into cage 41, module receiving opening 43a, which may correspond to the position of key patter portions 45a'/45b', is positioned within non-fin gap 25a of pluggable module 11a. Similarly, key-pattern portion 45a"/45b" provides an opening for fins 23b of pluggable module 11b. Like in the case of cage 31 of FIGS. 3A and 3B, key-pattern portions 45a"/45b" of cage 41 coincides with the module receiving opening 43b of cage 45. Therefore, when pluggable module 11b is fully inserted into cage 41, key patter 45a"/45b" is positioned within the non-fin gap 25b of pluggable module 11b.

Figure 12:
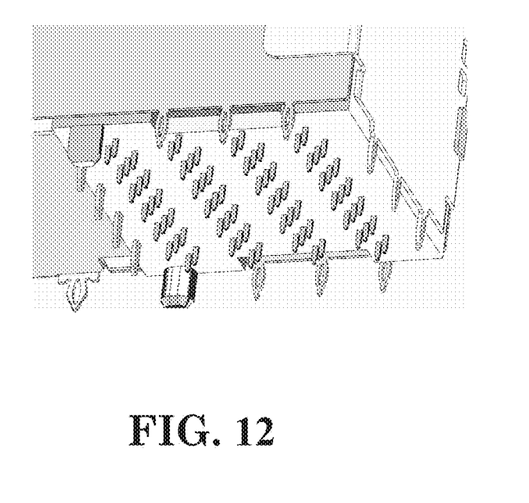
FIG. 12 illustrates a bottom view of an example press fit cage.
Figure 13:
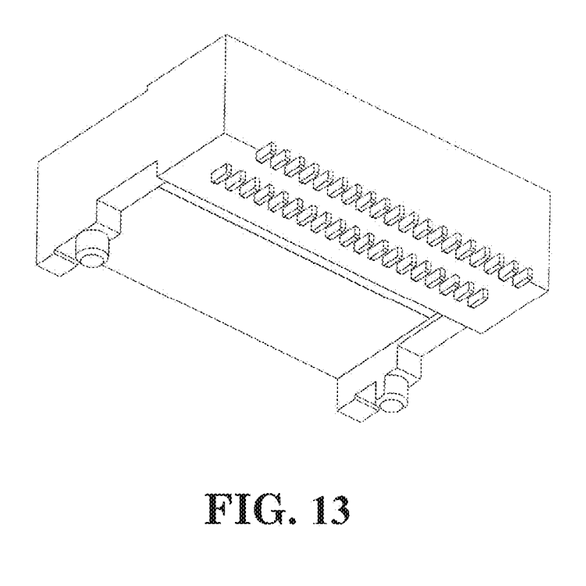
FIG. 13 illustrates a bottom view of an example surface-mount technology (SMT) cage.

Cages in particular embodiments are illustratively shown as configured for thru-hole soldering mounting, but it is to be understood that the cages of the present embodiments may utilize any mounting/coupling technology for attaching to a PCB assembly. For example, the present cages may be configured for press fit attachment to a PCB, or configured for attachment using surface-mount technology (SMT). For illustration purposes, FIG. 12 illustrates a bottom view of an example press fit cage, and FIG. 13 illustrates a bottom view of an example surface-mount technology (SMT) cage. The present cages may further be attached "belly to belly" on the top and bottom of a PCB assembly.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A pluggable module comprising:
a back-end portion with a wire-receiving opening;
a shell portion extending from the back-end portion to a front-end portion, the front-end portion having a contact-exposing opening, the shell portion having a plurality of sides; and
a plurality of fins on at least one side of the shell portion, the fins extending along a length of the shell portion from a start position toward the front-end portion, wherein a non-fin gap is defined on the at least one side of the shell portion between the back-end portion and the start position of the fins, wherein the non-fin gap is a substantially planar surface, wherein the non-fin gap is parallel to the extension direction of the shell portion, and wherein the non-fin gap separates the back-end portion from the start position of the fins.

2. The pluggable module of claim 1, wherein:
the at least one side of the shell portion having the plurality of fins is a lower-top surface of the shell portion;
the back-end portion has an upper-top surface higher than the lower-top surface, and a front wall that extends from a front edge of the upper-top surface to a back edge of the lower-top surface; and
on the lower-top surface, the non-fin gap extends from the start position of the fins to the back edge of the lower-top surface.

3. The pluggable module of claim 2, wherein the fins on the lower-top surface extend higher than the upper-top surface of the back-end portion.

4. The pluggable module of claim 2, wherein:
the pluggable module plugs into a cage having a module-receiving opening that has a key pattern configured to maintain a separation gap sufficient for permitting entrance of the fins on the first lower-top surface of the shell portion into the module-receiving opening;
the module-receiving opening is at least 25% taller than the height of the back-end portion of the pluggable module.

5. The pluggable module of claim 1, wherein:
the pluggable module plugs into a cage having a module-receiving opening that has a key pattern configured to maintain a separation gap sufficient for permitting entrance of the fins into the module-receiving opening.

6. The pluggable module of claim 5, wherein:
the key pattern has at least a first key-pattern portion and a second key-pattern portion, wherein the first and second key-pattern portions are (1) on opposing walls of the module-receiving opening, (2) extend toward each other, and (3) maintain the separation gap sufficient for permitting entrance of the fins into the module-receiving opening.

7. The pluggable module of claim 5, wherein the module-receiving opening has at least one rotating door configured to rotate toward an interior of the cage as the pluggable module is inserted into the module-receiving opening, and to remain rotated while the pluggable module remains inserted.

8. The pluggable module of claim 5, wherein when the pluggable module is fully inserted into the cage, the module-receiving opening of the cage is positioned within the non-fin gap of the pluggable module.

9. The pluggable module of claim 5, wherein:
the module-receiving opening opens into a module-receiving cavity having a length extending to a rear end of the cage; and
the cage has air vents positioned within an area extending from the rear end of the cage to not more than one-half of the length of the module-receiving cavity.

10. The pluggable module of claim 9, wherein the air vents are on rear and side panels of the cage and provide at least 80% open area for venting.

11. The pluggable module of claim 9, wherein the cage has a coupling circuit located at an interior-side of the rear end of the cage, the coupling circuit being configured to mate with module contacts accessible through the contact-exposing opening of the pluggable module.

12. A transceiver including the pluggable module of claim 1.

13. The transceiver of claim 12, wherein the transceiver is a small form-factor transceiver selected from a group comprising: a SFP+ transceiver, a QSFP transceiver, a CSFP transceiver, and a SFSW transceiver.

14. The transceiver of claim 12, wherein the contact-exposing opening exposes a plurality of rows of electrical contacts.

15. A module cage comprising:
a module-receiving opening having a key pattern configured to maintain a separation gap sufficient for permitting entrance of fins on a pluggable module into the module-receiving opening, wherein the key pattern is further configured to provide airflow upon receiving fins on the pluggable module.

16. The module cage of claim 15, wherein:
the key pattern has at least a first key-pattern portion and a second key-pattern portion, wherein the first and second key-pattern portions are (1) on opposing walls of the module-receiving opening, (2) extend toward each other, and (3) maintain the separation gap sufficient for permitting entrance of the fins on the pluggable module into the module-receiving opening.

17. The module cage of claim 15, wherein the module-receiving opening opens into a module-receiving cavity within the module cage, and the module-receiving cavity has a length extending to a rear end of the module cage, the module cage further comprising:
air vents positioned within an area extending from the rear end of the module cage to not more than one-half of the length of the module-receiving cavity.

18. The module cage of claim 15, wherein:
the pluggable module includes (1) a back-end portion with a wire-receiving opening, (2) a shell portion having a plurality of sides and extending from the back-end portion to a front-end portion that has a contact-exposing opening, (3) a plurality of fins on at least one side of the shell portion, the fins extending along a length of the shell portion from a start position toward the front-end portion, and (4) a non-fin gap defined on the at least one side of the shell portion between the back-end portion and the start position of the fins; and
the module-receiving opening is positioned within the non-fin gap when the pluggable module is fully inserted into the module cage.

19. A module cage comprising:
a module-receiving opening configured to receive a pluggable module with fins;
wherein the module-receiving opening has a rotating door configured to be rotated toward an interior of the module cage by the fins as the pluggable module is inserted into the module-receiving opening with a gap sufficient for permitting entrance of the fins on the pluggable module, and to remain rotated while the pluggable module remains inserted, wherein the rotating door is further configured to provide airflow upon receiving fins on the pluggable module.

\* \* \* \* \*